United States Patent [19]

O'Brien

[11] Patent Number: 4,716,822
[45] Date of Patent: Jan. 5, 1988

[54] ICE-CREAM MAKER

[75] Inventor: William J. O'Brien, Vaucluse, Australia

[73] Assignee: Breville R & D Pty. Ltd., Pyrmont, Australia

[21] Appl. No.: 893,863

[22] Filed: Aug. 6, 1986

[30] Foreign Application Priority Data

Oct. 17, 1985 [AU] Australia ............................... PH2953
Nov. 7, 1985 [AU] Australia ............................... PH03298
Nov. 28, 1985 [AU] Australia ............................... PH03618
May 26, 1986 [AU] Australia ............................... PH06097

[51] Int. Cl.[4] ........................... A23C 3/04; A23G 9/00
[52] U.S. Cl. ...................................... 99/455; 62/342; 366/149; 366/279
[58] Field of Search ............... 366/144, 145, 147, 149, 366/293, 295, 309, 312, 279, 197, 205; 62/342, 343; 99/452, 453, 485

[56] References Cited

U.S. PATENT DOCUMENTS

| 1,973,291 | 9/1934 | Moore | 99/455 X |
| 2,252,043 | 8/1941 | Sissel | 366/144 X |
| 2,541,814 | 2/1951 | Gaddini | 366/213 X |
| 3,505,735 | 4/1970 | Breuning | 99/455 |
| 4,070,957 | 1/1978 | Korekawa et al. | 366/149 X |
| 4,551,026 | 11/1985 | Cristante | 366/149 |
| 4,632,566 | 12/1986 | Masel et al. | 366/149 |

Primary Examiner—Timothy F. Simone
Attorney, Agent, or Firm—Murray and Whisenhunt

[57] ABSTRACT

A domestic ice-cream maker for insertion in a freezer consisting of a container in the form of an annular trough, a mixing blade being arranged in the trough for rotating around the axis of the trough and being driven by an electric motor which is characterized by the provision of a fan or fans arranged above the container to direct a stream of air downwardly onto the surface of ice-cream mix in the container to produce rapid freezing of the ice-cream mix when the ice-cream maker is inserted in the freezer compartment of a refrigerator. Preferably, the electric motors are driven by a pack of rechargeable battery cells contained in the ice-cream maker.

7 Claims, 6 Drawing Figures

ICE-CREAM MAKER

The present invention relates to ice-cream makers and more particularly to ice-cream makers intended for domestic use.

BACKGROUND OF THE INVENTION

It has long been known that in the making of ice-cream it is necessary to stir the ice-cream mix while freezing it. If this is not done large ice crystals form making the product unpalatable. In the earlier forms of domestic ice-cream makers this was achieved by the use of an outer container having within it a rotatable inner container. The space between the two containers was filled with a mixture of ice and salt and the ice-cream mix was placed in the inner container and the inner container rotated, the ice-cream mix being stirred by means of a fixed mixing blade. Alternatively, the mixing blade was rotated. Ice-cream makers of this kind are at present in use and, whereas in the earliest forms, the rotation was carried out by hand it is now usually carried out by means of an electric motor. Such ice-cream makers are effective but they are relatively cumbersome and inconvenient to use by reason of the necessity of preparing a mixture of crushed ice and salt.

Another form of domestic ice-cream makers consists in what is in effect, a miniature freezer, the apparatus incorporating a refrigerating unit and a means for stirring a ice-cream mix in a container. Such ice-cream makers are extremely effective but, by reason of the necessity of providing a refrigerating apparatus, they are expensive.

A third form of apparatus has been marketed consisting simply of a container having within it a rotatable mixing blade driven by a small electric motor which is powered through a connecting cord by means of which the motor is connected to the electric mains. Such ice-cream makers are simply placed in the freezing compartment of a conventional refrigerator, the connecting cord is led out of the refrigerator through the door seal and connected to the electric mains. Stirring is carried on until the ice-cream mix has reached the desired consistency. In some ice-cream makers of this sort a thermostatic control is provided so that when the consistency of the ice-cream mix is such as to cause the motor to overheat a thermostat switch switches the motor off. In some ice-cream makers of this sort the ice-cream mix is contained in a simple metal container and the ice-cream mix is chilled simply by its presence in the freezer compartment. In one form of apparatus, however, an electric motor is not only used to rotate a mixing blade in the ice-cream mix container but also to drive a small fan which acts to draw in air around the bottom of the container and up its sides. This does, to some extent, speed up the freezing of the ice-cream mix.

Domestic ice-cream makers of the last described category, despite being quite effective and inexpensive, have not achieved a high degree of popularity. This is believed to be due to an irrational fear on the part of users of introducing into a refrigerator a mains powered electrical device. This is despite the fact that in some cases the voltage applied to the motor is only 24 volts.

One object of the present invention is to provide domestic ice-cream makers of the third category in which the use of a mains connection is dispensed with by providing a battery pack which forms part of the ice-cream maker. While this concept is simple enough it was found in practice extremely difficult to construct an ice-cream maker which would make ice-cream with a battery pack of an acceptable size. After considerable experiment it was found that the solution to the problem lay in the provision of a fan which blew cold air from the freezer compartment directly into the ice-cream mix while it was being stirred. By doing this it was found possible to make ice-cream of an acceptable consistency during the life of a pack of six commercially available rechargeable cells.

A further object of the invention is to provide a domestic ice cream maker of the third category of improved effectiveness insofar as the time required for making the icecream is shortened and in that the quality of the product is somewhat better, whether the apparatus is driven from a battery pack or from mains. These improvements are achieved by the use of a fan or other means to blow cold air from the freezer compartment directly onto the icecream mix. In this connection, it has been found that if instead of using a single fan for this purpose two fans arranged side by side are used still further improvements in the results are obtained.

SUMMARY OF THE INVENTION

The present invention consists in a domestic icecream maker for insertion in a freezer consisting of a container in the form of an annular trough, a mixing blade being arranged in the trough for rotation around the axis thereof, electric motor means in driving connection with the mixing blade to produce rotation thereof, characterised in that means are provided to produce a stream of air directed downwardly onto the surface of an icecream mix in the container.

In preferred forms of the invention the electric motor or electric motors for driving the mixing blade and the fan or fans is or are powered by a battery pack so that the icecream maker is a self-contained unit that may be placed in the freezing compartment of a refrigerator without the necessity for leading an electric mains cord into the refrigerator. It is further preferred that a pair of fans arranged side by side is used for directing air onto the surface of icecream in the container and it is also preferred to use a mixing blade of a configuration such that on rotation it acts to separate the icecream mix from the inner and outer walls of the container to produce gaps between the icecream mix and the walls of the container through which the icecream mix is accessible to cold air from the fan or fans.

BRIEF DESCRIPTION OF THE DRAWINGS

In order that the nature of the invention may be better understood and put into practice a preferred embodiment thereof is hereinafter described, by way of example, with reference to the accompanying drawings, in which.

DETAILED DESCRIPTION OF THE INVENTION

Figure 1:
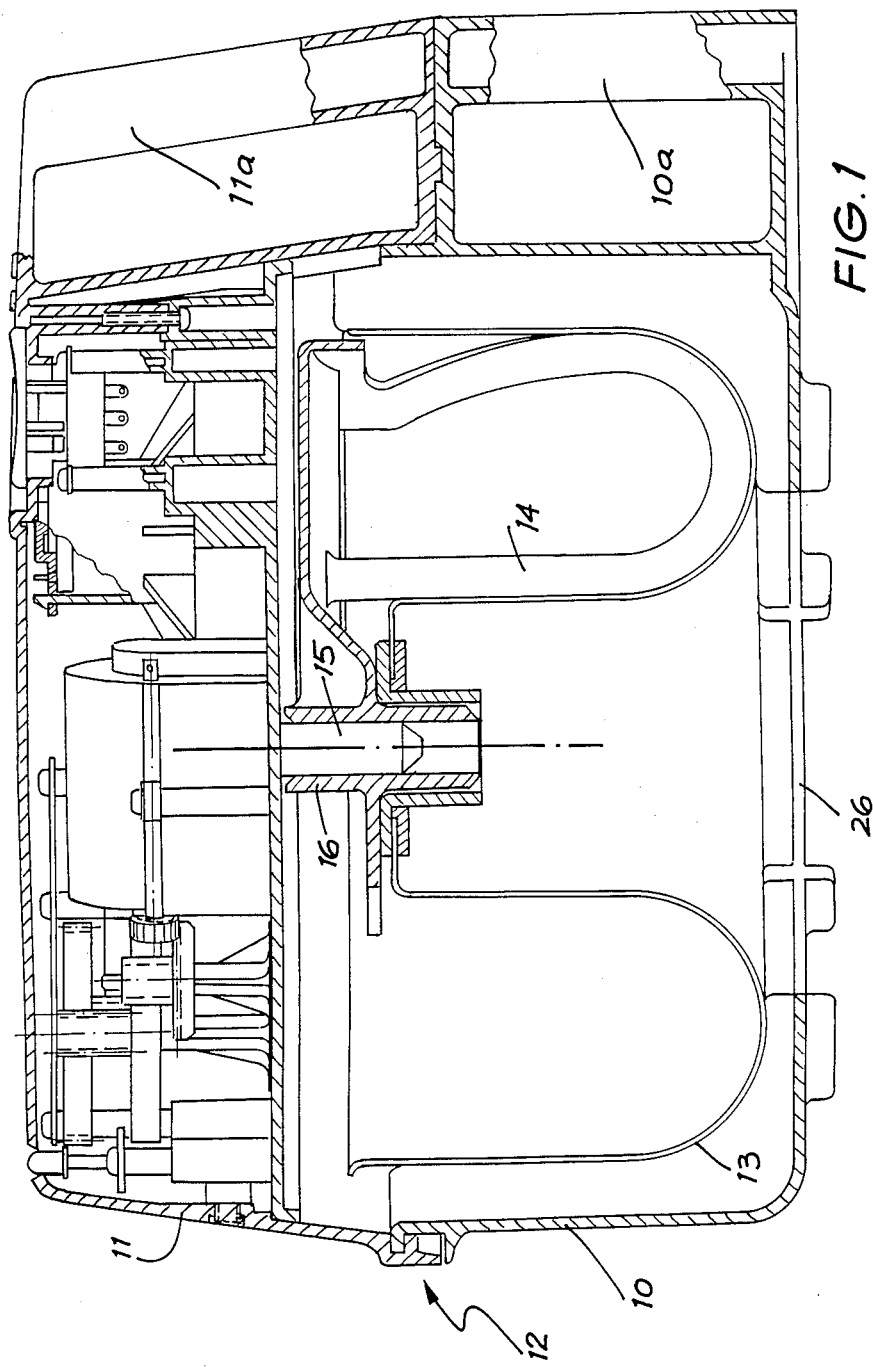
FIG. 1 is a median cross sectional view of an ice-cream maker according to the invention.
Figure 2:
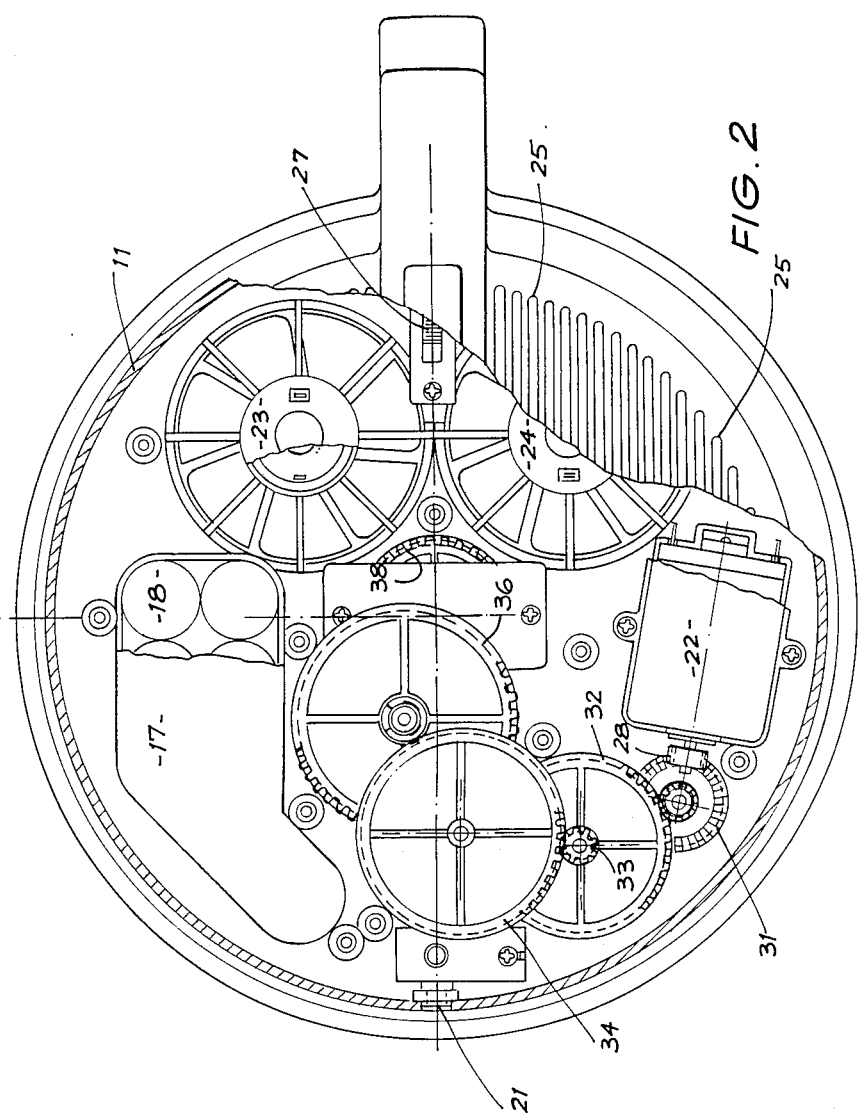
FIG. 2 is a plan view thereof with the upper cover partially broken away to expose the parts underneath.

The icecream maker illustrated in the drawings is contained in a plastic container consisting of a lower portion 10 and an upper portion 11 which are interconnected by means of a bayonet joint shown in section at 12. A handle portion 10a extends at one side from the lower portion 10 and a corresponding handle portion 11a from the upper portion 11. These together constitute a handle by means of which the icecream maker may be lifted into or out of the freezer compartment of a refrigerator.

The lower portion 10 contains the container 13 in which the icecream is made. This is in the form of a stainless steel or other metal annular trough the upper face of which is open. Within the container 13 the mixing blade 14, the construction of which is described in greater detail below, is mounted for rotation about the axis of the container by means of the driving shaft 15. All the remaining parts of the icecream maker are contained in the upper casing 11 which is separable from the lower casing 10 by partial rotation in relation thereto. After such partial rotation has been effected the upper container 11 and its contents may be lifted from the lower container 10 and the driving shaft 15 withdrawn from the socket 16 constituting part of the mixing blade 14. The mixing blade 14 and the container 13 may then be removed from the lower casing 10 for washing.

In the upper casing 11 is a battery container 17 which is made of heat insulating material. This serves to retain the slight heat generated by operation of the eight rechargable cells 18 during operation of the icecream maker. The rechargable cells 18 are connected by electric circuitry to a socket 21 to which a battery charger may be connected when the cells 18 require recharging. A small electric motor 22 serves to drive the driving shaft 15 through speed reduction gearing which is described in more detail below in connection with FIG. 3. Two fans 23 and 24 are arranged side by side immediately above the open face of the container 13. Each fan is driven by a small separate electric motor contained within the hub of the fan. The fans draw air through the openings 25 in the upper casing 11 and direct it downwardly onto the surface of an icecream mix in the container 13. The air then passes around the container 13 and out through an aperture 26 in the bottom of the lower casing 10.

While the use of a single fan arranged immediately above the open face of the container produces improved results the use of two fans side by side in the manner illustrated produces even better results. For reasons that are not fully understood the results produced by two fans arranged diametrically apart does not produce as good results. It is believed but this has not been established as scientific fact that the concentration of cold air impinging on the surface of the icecream produced by the two fans arranged side by side forms a frozen crust on the ice cream mix immediately beneath the fans which is subsequently incorporated into the mix by the action of the mixing blade 14. Whether or not this is correct it has been found empirically that the use of two fans produces a very satisfactory icecream within a time well within the capacity of the cells 18.

The cells 18, the motor 22 and the motors driving fans 23 and 24 are connected in an electric circuit details of which are not shown, which is controlled by an on-off switch 27 accessible from the top of the upper casing 11. The electric circuit is such that four of the cells 18 are used to drive the motors of the two fans 23 and 24 and four to drive the motor 22. The fan motors absorb less energy than the motor 22 and this arrangement ensures that the fans continue to operate after rotation of the mixing blade 14 has ceased.

Figure 3:
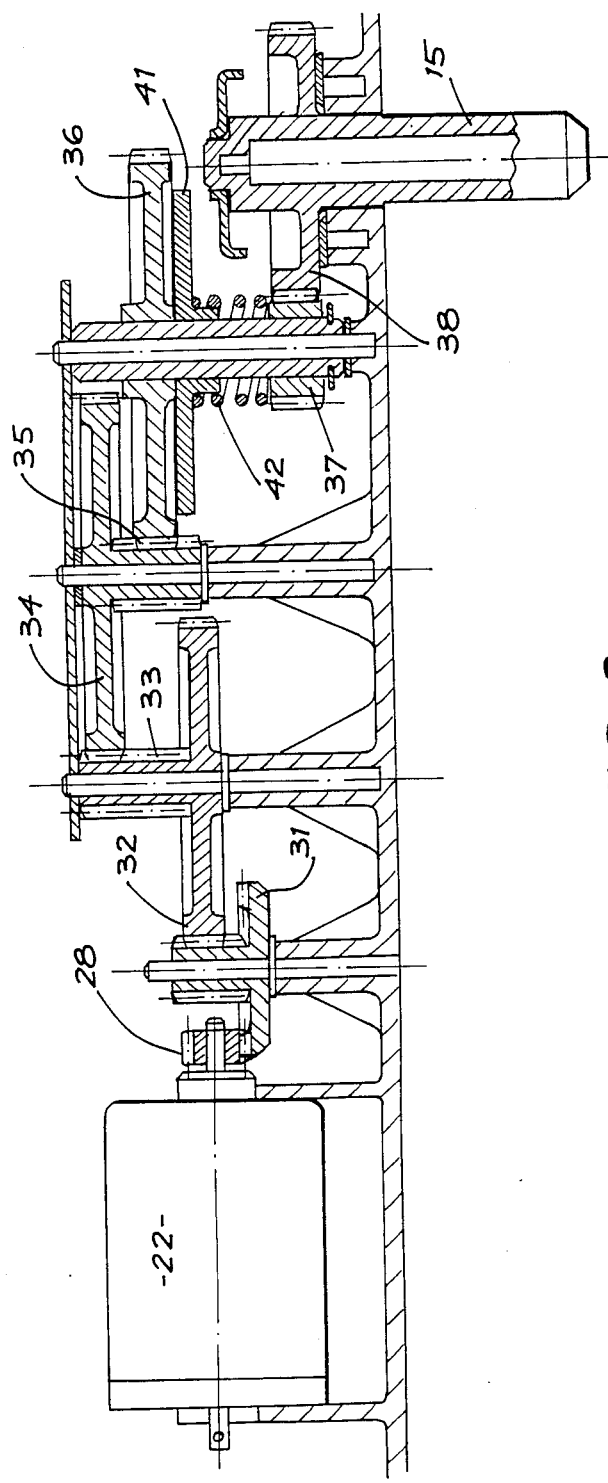
FIG. 3 is a developed drawing of the transmission gear system.

The motor 22 drives the shaft 15 through a speed reduction gearbox consisting of pinions 28, 31, 32, 33, 34, 35, 36, 37 and 38 the arrangement of which is clearly shown in the developed drawing of the transmission shown in FIG. 3. Between pinion 36 and 37 is a dog clutch 41 which is spring loaded by means of the coil spring 42. As the ice cream mix stiffens during freezing resistance to movement of the mixing blade 14 increases and when this reaches a certain level the clutch 41 will start to slip and the mixing blade will become stationary. This ensures that the motor 22 will not be damaged by overheating when the motion of the mixing blade is halted. As has been explained above the fans 23 and 24 will continue to rotate when movement of the mixing blade has ceased. Slipping of the clutch 41 provides an audible indication that making of ice cream has been completed.

Figure 4A:
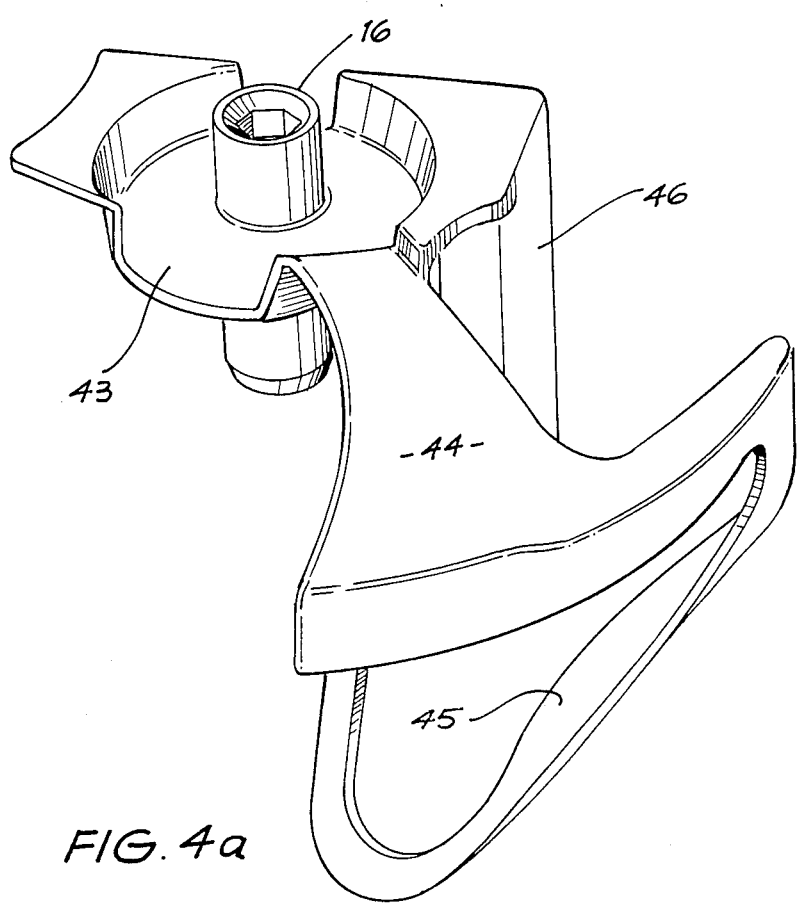
FIGS. 4a and 4b are views of the mixing blade.
Figure 4B:
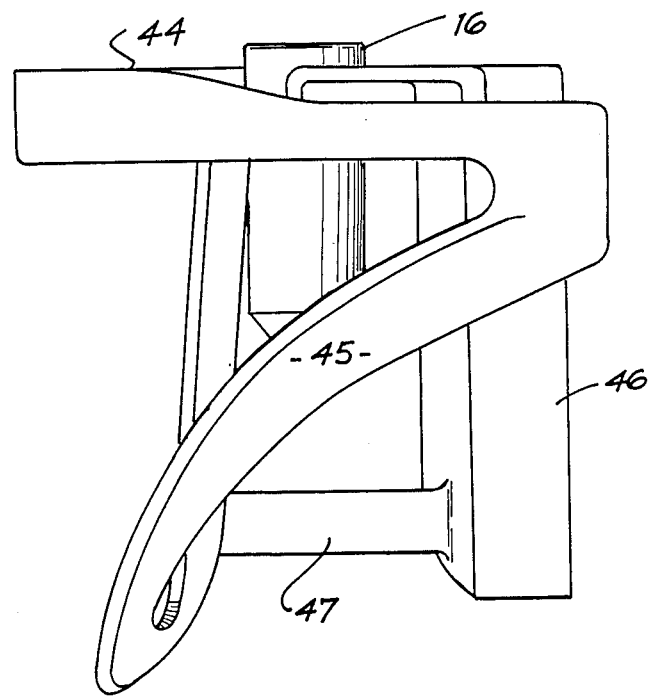

As seen in FIGS. 4a and 4b, the blade 14 is of a complex shape the lower part thereof having an outline corresponding to the internal shape of the container 13 as best seen in FIG. 1. The blade is formed by moulding from plastic material and consists of a central socket 16 surrounded by an annular portion 43 from which projects an upper radially extending portion 44 which is joined by a circumferentially extending sloping portion 45 which extends at an angle of about 45° to the bottom of the container 13. A leading vertically extending portion 46 extends from the top to the bottom of the blade and is supported at the bottom by the strut 47.

Figure 5:
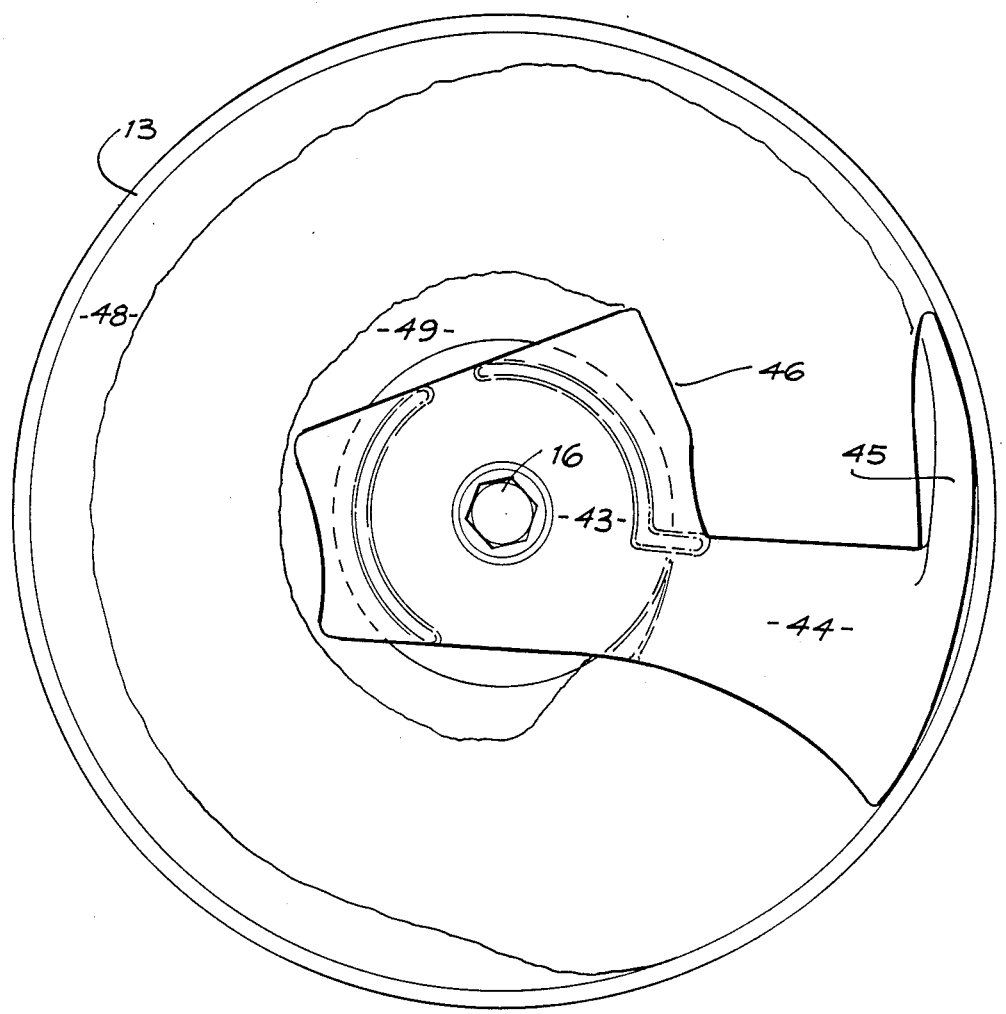
FIG. 5 is a diagrammatic plan view of the container illustrating the effect of rotating the blade in an ice cream mix.

The shape of the blade has been arrived at empirically with the particular intention of producing the effect illustrated in FIG. 5 from which it will be seen that rotation of the blade in the ice cream mix causes a gap to form between the ice cream mix and the outer wall of the container 13 as indicated at 48 and also a gap between the ice cream mix and the inner wall of the container as indicated at 49. The figure shows the configuration of the ice cream mix at a fairly late stage in the formation of ice cream where the ice cream mix has become relatively rigid. During earlier stages while the ice cream mix is more liquid the pattern is somewhat different but the end achieved by the particular shape adopted for the blade is that the ice cream mix is not only stirred as the mixing blade rotates, but also gaps are formed between the ice cream mix and the container into which air from the fans 23 and 24 can penetrate.

In use, the container 13 is filled with a liquid ice cream mix. Parts 11 and 12 of the container are then united so that the driving shaft 15 enters the socket 16 and the parts are connected by the bayonet joint 12. The whole machine is then inserted into the freezing compartment of a refrigerator and operation of the motor started by means of the switch 27. The mixing blade 14 is rotated continuously by the action of the motor 22 and the fans 23 and 24 send a current of air onto the surface of the ice cream mix. After a period which may be of the order of 45 minutes the ice cream mix will become sufficiently stiff to cause the clutch 41 to slip which is an indication that the machine may be removed from the freezer. The two halves of the container are then disconnected and ice cream served directly from the container 13. Thereafter the container 13 and the blade 14 may be removed for washing and a battery charger plugged into the socket 21 to recharge the battery pack for subsequent use.

I claim:

1. A domestic ice-cream maker for insertion in a freezer, comprising:
   a container in the form of an annular trough having an axis;
   a mixing blade arranged in said trough for rotation around said axis;
   first electric motor means drivingly connected to said mixing blade for producing rotation of said blade;
   means for producing a stream of air directed downwardly onto to a surface of an ice-cream mix in said container; and
   means for directing air leaving said surface of said ice-cream mix around said container and through an outlet below said container.

2. A domestic ice-cream maker as claimed in claim 1, wherein said means for producing a stream of air consists of a fan or fans arranged above said container and second electric motor means for rotating the or each fan.

3. A domestic ice-cream maker as claimed in claim 2, wherein two fans are arranged side by side.

4. A domestic ice-cream maker as claimed in claim 1, 2, or 3, wherein said first and second electric motor means are energized by a battery pack consisting of a plurality of cells contained in the ice-cream maker.

5. A domestic ice-cream maker as claimed in claim 4, wherein said first and second electric motor means are energized by different groups of cells of said battery pack.

6. A domestic ice-cream maker as claimed in claim 1, 2, or 3, wherein said mixing blade is constructed and arranged to separate ice-cream mix from inner and outer walls of said container as said blade rotates thereby producing circumferentially and axially extending gaps between the ice-cream mix and said walls of said container into which said stream of air can penetrate.

7. A domestic ice-cream maker as claimed in claim 1, 2 or 3, wherein said first electric motor means drives said mixing blade through a gear train including a spring loaded dog clutch arranged to slip when the ice-cream mix reaches a predetermined level of consistency during freezing.

* * * * *